(12) United States Patent
Siegel et al.

(10) Patent No.: US 7,499,899 B2
(45) Date of Patent: Mar. 3, 2009

(54) DYNAMIC SOFTWARE INTEGRATION ARCHITECTURE

(75) Inventors: Neil G. Siegel, Rancho Palos Verdes, CA (US); Maria Heloisa Penedo, Los Angeles, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 651 days.

(21) Appl. No.: 10/884,071

(22) Filed: Jul. 2, 2004

(65) Prior Publication Data
US 2006/0005204 A1    Jan. 5, 2006

(51) Int. Cl.
*G06F 17/00* (2006.01)
*G06N 5/02* (2006.01)

(52) U.S. Cl. ..................................... 706/47
(58) Field of Classification Search ................ 706/45, 706/47; 719/313
See application file for complete search history.

(56) References Cited

U.S. PATENT DOCUMENTS

| | | | |
|---|---|---|---|
| 5,517,645 A | | 5/1996 | Stutz et al. |
| 5,535,322 A | | 7/1996 | Hecht |
| 5,893,128 A | | 4/1999 | Nauckhoff |
| 6,055,519 A | * | 4/2000 | Kennedy et al. ............... 705/80 |
| 6,080,202 A | | 6/2000 | Strickland et al. |
| 6,085,238 A | * | 7/2000 | Yuasa et al. .................. 709/223 |
| 6,141,653 A | * | 10/2000 | Conklin et al. ................ 705/80 |
| 6,199,202 B1 | | 3/2001 | Coutant et al. |
| 6,332,135 B1 | * | 12/2001 | Conklin et al. ................ 705/80 |
| 6,336,105 B1 | * | 1/2002 | Conklin et al. ................ 705/80 |
| 6,338,050 B1 | * | 1/2002 | Conklin et al. ................ 705/80 |
| 6,349,297 B1 | | 2/2002 | Shaw et al. |
| 6,539,396 B1 | * | 3/2003 | Bowman-Amuah ..... 707/103 R |
| 6,658,568 B1 | * | 12/2003 | Ginter et al. ................. 713/193 |
| 6,738,975 B1 | * | 5/2004 | Yee et al. ..................... 719/310 |
| 7,047,227 B2 | * | 5/2006 | Batachia et al. ............... 706/60 |
| 7,076,552 B2 | * | 7/2006 | Mandato ..................... 709/226 |
| 7,103,580 B1 | * | 9/2006 | Batachia et al. ............... 705/80 |
| 7,116,789 B2 | * | 10/2006 | Layton et al. .................. 381/17 |

(Continued)

FOREIGN PATENT DOCUMENTS

EP        1122652 A2  *  8/2001

(Continued)

OTHER PUBLICATIONS

Policy Negotiation System Architecture for Privacy Protection In Joo Jang; Wenbo Shi; Hyeon Seon Yoo; Networked Computing and Advanced Information Management, 2008. NCM '08. Fourth International Conference on vol. 2, Sep. 2-4, 2008 pp. 592-597 Digital Object Identifier 10.1109/NCM.2008.244.*

(Continued)

*Primary Examiner*—Michael B Holmes
(74) *Attorney, Agent, or Firm*—Tarolli, Sundheim, Covell & Tummino LLP

(57) ABSTRACT

A software integration architecture is disclosed. The architecture includes software modules operative to spontaneously integrate distributed components/systems into new integrated systems via dynamic integration connectors, with minimal or no changes to the existing software components/systems/databases. The architecture employs integration rule sets that define access and communication rules associated with a respective software component, and a negotiation engine that negotiates with the integration connectors to define data and/or control connectivity based on the integration rule sets.

27 Claims, 6 Drawing Sheets

U.S. PATENT DOCUMENTS

| | | | |
|---|---|---|---|
| 7,133,846 B1 * | 11/2006 | Ginter et al. .................. | 705/54 |
| 7,149,724 B1 * | 12/2006 | Flanagan et al. .............. | 705/80 |
| 7,152,094 B1 * | 12/2006 | Jannu et al. ................. | 709/206 |
| 7,162,458 B1 * | 1/2007 | Flanagan et al. .............. | 705/80 |
| 7,165,174 B1 * | 1/2007 | Ginter et al. ................ | 713/153 |
| 7,194,442 B1 * | 3/2007 | Flanagan et al. .............. | 705/80 |
| 7,194,764 B2 * | 3/2007 | Martherus et al. .............. | 725/8 |
| 7,203,662 B2 * | 4/2007 | Das et al. ...................... | 705/37 |
| 7,222,109 B1 * | 5/2007 | Flanagan et al. .............. | 705/80 |
| 7,373,325 B1 * | 5/2008 | Hadingham et al. ........... | 705/37 |
| 7,415,617 B2 * | 8/2008 | Ginter et al. ................ | 713/189 |
| 2002/0120945 A1 | 8/2002 | Schwalb | |
| 2003/0009263 A1 | 1/2003 | Watkins | |
| 2003/0041178 A1 * | 2/2003 | Brouk et al. ................. | 709/313 |
| 2004/0044776 A1 * | 3/2004 | Larkin ........................ | 709/228 |
| 2004/0216147 A1 | 10/2004 | Yanosy et al. | |
| 2005/0015619 A1 * | 1/2005 | Lee ............................ | 713/201 |

FOREIGN PATENT DOCUMENTS

| | | |
|---|---|---|
| WO | WO 02/067111 A2 | 8/2002 |
| WO | WO 03/032225 A1 | 4/2003 |

OTHER PUBLICATIONS

Collaborative Privacy Management System In Joo Jang; Wenbo Shi; Hyeong Seon Yoo; Information Security and Assurance, 2008. ISA 2008. International Conference on Apr. 24-26, 2008 pp. 52-56 Digital Object Identifier 10.1109/ISA.2008.55.*

Access Control Agnostic Trust Negotiation Decision Engine Diaz-Sanchez, D.; Marin, A.; Almenarez, F.; Personal, Indoor and Mobile Radio Communications, 2007. PIMRC 2007. IEEE 18th International Symposium on Sep. 3-7, 2007 pp. 1-5 Digital Object Identifier 10.1109/PIMRC.2007.4394694.*

Intelligent aggregation of purchase orders in e-procurement Guijun Wang; Miller, S.; EDOC Enterprise Computing Conference, 2005 Ninth IEEE International Sep. 19-23, 2005 pp. 27-36 Digital Object Identifier 10.1109/EDOC.2005.19.*

Negotiation support in online markets, with competition and co-operation Ananthanarayanan, R.; Kumar, M.; E-Commerce Technology, 2005. CEC 2005. Seventh IEEE International Conference on Jul. 19-22, 2005 pp. 42-49 Digital Object Identifier 10.1109/ICECT.2005.62.*

Modelling & simulating chained negotiation to enable sharing of notifications Lawley, R.; Luck, M.; Moreau, L.; Web Intelligence, 2005. Proceedings. The 2005 IEEE/WIC/ACM International Conference on Sep. 19-22, 2005 pp. 479-482 Digital Object Identifier 10.1109/WI.2005.102.*

Negotiation in a multi-dimensional CBR system Chew Esyin; Mustapha, S.M.F.D.S.; Cybernetics and Intelligent Systems, 2004 IEEE Conference on vol. 2, 2004 pp. 1192-1195 Digital Object Identifier 10.1109/ICCIS.2004.1460760.*

Search Report under Section 17 in the United Kingdom for corresponding GB 0512591.9, search completed Aug. 17, 2005.

* cited by examiner

DYNAMIC SOFTWARE INTEGRATION ARCHITECTURE

TECHNICAL FIELD

The present invention relates generally to software, and more particularly to a software integration architecture.

BACKGROUND

Integration of currently existing non-compatible system/software components is a necessary reality. Presently, there are thousands of existing computer and/or software systems (e.g., legacy systems) that were designed to support information exchange with, at most, a defined group of systems. Economic factors make it necessary to continue to use these systems for some period of time, yet in many cases it is desirable to integrate these defined groups of systems with a number of other systems outside of their existing integration capabilities. Today's global networking/communications capability provides a data path between many of existing systems, but it has proven expensive and time-consuming to modify the software and data structures of these systems, so as to provide complete integration.

Over the last ten years many mechanisms for integration have been offered for supporting different aspects of integration and interoperability. Work-flow mechanisms, for example, have been built to support limited control integration (e.g., linear process execution). However, work-flow systems rely on sequential execution, and are somewhat impractical for systems based on an event-driven paradigm. Most approaches to achieve integration that have been offered to date either only work for systems built from the beginning around their design paradigm or software structure, or require expensive and time-consuming re-engineering of the existing system. Therefore, a technique to provide a quick and inexpensive integration solution of existing computer/software systems would be highly desirable in the business community at large.

In many cases, achieving interoperability between two or more computer/software components is significantly complex. Therefore, integration connector topologies have been developed to facilitate the integration process. A typical integration connector topology includes developing a plurality of custom connectors at a given component, where each component is customized to interact unilaterally with a "mating" custom connector in another component/system. Therefore, each component/system in the integration process needs a plurality of customized connectors. Development of these customized connectors requires knowledge of the resources/data required and provided by each of the component/system being integrated. In order for those connectors to be written, changes of the software in the existing components/systems and a direct connection among those components/systems is typically required.

Another connector topology includes employing a "middleware component" (e.g., CORBA, many others) to abstract the actual interfaces of the other systems and/or their location. Middleware connectors can be developed only needing knowledge about the middleware language/mechanism and the resources/data it needs or provides. However, the numbers of connectors may still be the same as the custom connector topology, and the extent of the effort required to re-engineer an existing software system to utilize such a middleware component can be prohibitive.

SUMMARY

The present invention relates to a software integration architecture for integrating software components. The architecture includes software modules operative to spontaneously integrate distributed components/systems into new integrated systems via dynamic integration connectors, with minimal or no changes to the existing software components/systems/databases. The architecture includes an integration rule set associated with each of a plurality of software components. The integration rule set defines rules associated with access and receipt of resources for a given software component, and is structured in a manner that requires little or no change to the existing software components. The architecture also includes a negotiation engine. The negotiation engine is operative to negotiate dynamically with respective connecting software components to define rules associated with integration of the software components, wherein a negotiation profile is generated for each software component that defines data and/or control connectivity between a respective software component and a connecting copy of the software component, based on the negotiations associated with each of the plurality of software components. The negotiation engine can be a single remote software module. Alternatively, each integration connector can include a respective negotiation engine.

Another embodiment of the present invention relates to a computer readable medium having computer executable components. The computer executable components comprise an integration rule set that defines rules associated with access and receipt of resources for a software component, a negotiation engine operative to negotiate dynamically with at least one other negotiation engine of a respective connecting software component to define rules associated with integration of the software components, and an integration sub-component set that provides a selection of data configuration protocols and data transfer protocols that can be employed by the negotiation engine to define flow control, data conversions and communication mechanisms for transferring data and control between the software component and at least one connecting software component.

Another embodiment of the invention relates to a method of integrating software components. The method comprises publishing an integration rule set associated with a software component, and subscribing to an integration rule set associated with a connecting software component. The method further comprises negotiating with the connecting software component to define data access profiles, connection profiles and flow control profiles for the exchange of data and/or control between the software component and the connecting software component based on the published and subscribed integration rule sets, and building a negotiation profile that defines the data and/or control connectivity between the software component and the connecting software component based on the negotiations.

DETAILED DESCRIPTION

The present invention relates to an architecture for integrating software components (e.g., automatic sharing of data and/or control between software components). The integration architecture provides integration connectors (e.g., software modules) operative to spontaneously integrate distributed software components/systems into new integrated systems via dynamic integration connectors, with minimal or no changes to the existing software components/systems including, for example their data bases. Spontaneous integration is defined as the automatic sharing or passing of data and/or control from one component to another either during or after termination of its execution, in which the components are previously incompatible or un-integrated data storage components, software modules, and/or systems, and for which the configuration/setup/establishment activity is comparatively modest. The configuration/setup/establishment activity supports the physical connectivity of the components, connectors and communication medium and interrelates the elements of the integration connectors.

Upon invocation (e.g., after the configuration/setup/establishment activity is complete), the integration connectors dynamically integrate with one another by negotiating the sharing of data and/or control of associated software components between one another, to define an integration configuration that establishes communication paths and sequences between software components to build an integrated system, and in accordance with the rules defined to govern that instance of interconnection. The integration connectors are operative to modify spontaneously (e.g., in real-time) integration configurations in response to changes caused by system/component changes, and/or the adding of additional systems/components to the current integrated system. Therefore, the dynamic integration connectors can constantly monitor interface and work-flow connection opportunities available at any instant in time.

Figure 1:
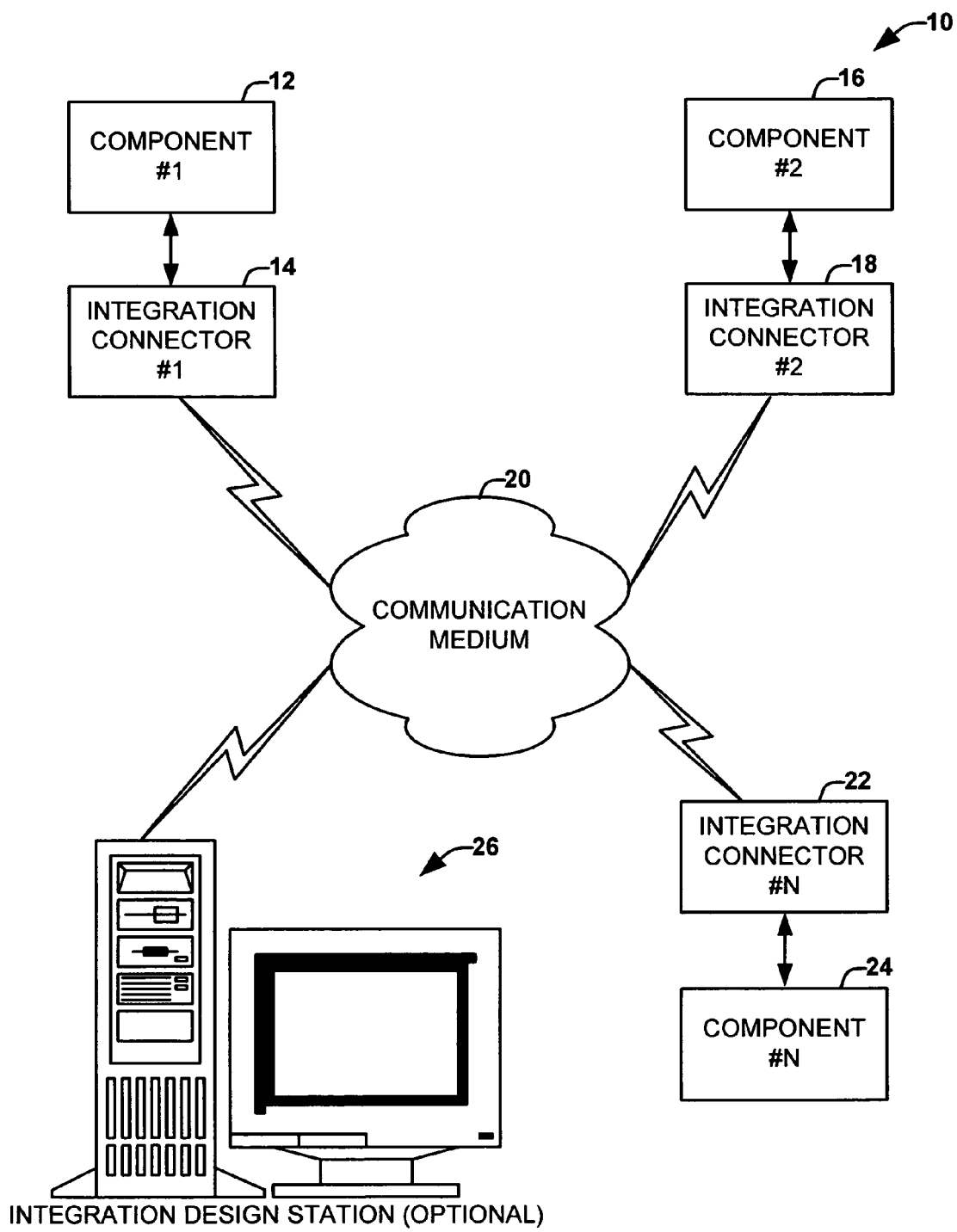
FIG. 1 illustrates a system for employing dynamic integration connectors in accordance with an aspect of the present invention.

FIG. 1 illustrates a system 10 that employs dynamic integration connectors in accordance with an aspect of the present invention. The system 10 includes a plurality of software components labeled #1 through #N, and associated dynamic integration connectors labeled #1 through #N, where N is an integer greater than or equal to two. The plurality of software components are coupled via respective integration connectors through a communication medium (or mixtures of media) 20 with little or no change to the components themselves. The communication medium 20 can be a process, an operating system, a middleware infrastructure, a local-area or wide-area network (wired or wireless), or a mixture of such mechanisms, which provides one or more communication mechanisms (e.g., paths and protocols) to pass data and/or control between software components.

Each integration connector is a particular instantiation of a generalized integration connector model. This particular instantiation may be realized before or during execution through manual modification of the generalized integration connector model, or through an automatic and dynamic generation mechanism. In either case, the particular instantiation will be able to negotiate dynamically with other integration connectors in support of over-all data/control exchange objectives.

The integration connectors may employ data and/or schemas in databases, and integration rules in order to determine interface and control-flow connection opportunities available at any instant in time. The integration rules associated with a given software component may be generated, either at invocation, assembly, initiation, or execution time. Additionally, the integration connectors can generate executable software programs and control mechanisms (e.g., negotiation profiles) that implement the appropriate (point-to-point) data links, rules, format and unit-of-measure conversions, and trigger/synchronization mechanisms in response to negotiations for control and/or data between integration connectors.

Upon activation, each integration connector may spontaneously negotiate with other components or with middleware, to define data access privileges based on fields of interest, communication link connections (e.g., data provided to a respective system, data provided from a respective system), data mappings and conversions, establish communication protocols, and timing updates. This process can be repeated periodically or driven by events, so as to identify spontaneously new integration opportunities that arise from new connectivity paths that may asynchronously become available to recover from link outages, or new components added to the system. Furthermore, integration connectors may define flow-control rules to determine a domain work-flow associated with the overall system.

In one aspect of the invention, the integration connectors may employ one or more data access schemas that allow connectors to extract data from an associated connector. For example, one schema might allow the module to extract one or more fields of data from a database. Schemas for interoperation may include XML schemas, or other forms of data definition. The integration connectors further comprise one or more data configuration protocols. The data configuration protocols provide instructions to the system 10 on the handling or mapping of extracted data in accordance with configuration data provided by integration rules, or by a user at an integration design station 26. These instructions can include unit conversions for one or more data fields, truncation instructions for long decimal values, and similar formatting issues. For example, the data configuration protocols can contain instructions to convert all received time data to minutes, to maintain consistency within a given software component and/or system.

The integration connectors further include one or more data selection and negotiation protocols that allow an integration connector to identify data fields of interest within its associated component. A user at a computer associated with the respective integration connector can determine the fields of interest or the user can set the fields of interest at the integration design station 26. The data selection protocol identifies available output data fields of interest and desired input fields of interest in its associated component. These available and desired data fields can be provided to one or more other components as part of a data negotiation.

Data transfer protocols at the integration connectors locate other operatively-connected components via their respective integration connectors, and control inter-component communications. The components can be connected as part of a local area network, a wide area network, as part of an inter-network connection or via a middleware component. The data transfer protocols can comprise network communication protocols (e.g., TCP/IP), as well as any other desired communication protocols. Once another integration connector is located, the connectors may exchange information as to their respective component's available and desired data fields, and automatically establish a data flow path between the two components. For example, if a component maintains a list on employee names, and another component requires it, the data negotiation protocols can negotiate a one-way mapping of the employee name fields from the first component to the second component. At the second component, the data field can be formatted by the data configuration protocols to a desired standard before it is provided to the second component.

The integration design station 26 can be part of an architecture. The integration design station 26 can interactively support the generation of integration connectors statically or dynamically. The integration design station 26 can also provide execution control monitoring that reads and/or executes the integration rules from the connectors or passes to them the necessary data and/or control-flow during execution. Thus, the integration design station 26 or the execution monitor can provide functionality associated with initiations, sequential control, event control, and monitoring of the data or control-flow processes. It could host a central negotiation engine. Additionally, the integration design station 26 can be provided with over-riding capabilities associated with the spontaneous negotiations between components, by defining and/or over-riding integration rule sets associated with the integration connectors.

Figure 2:
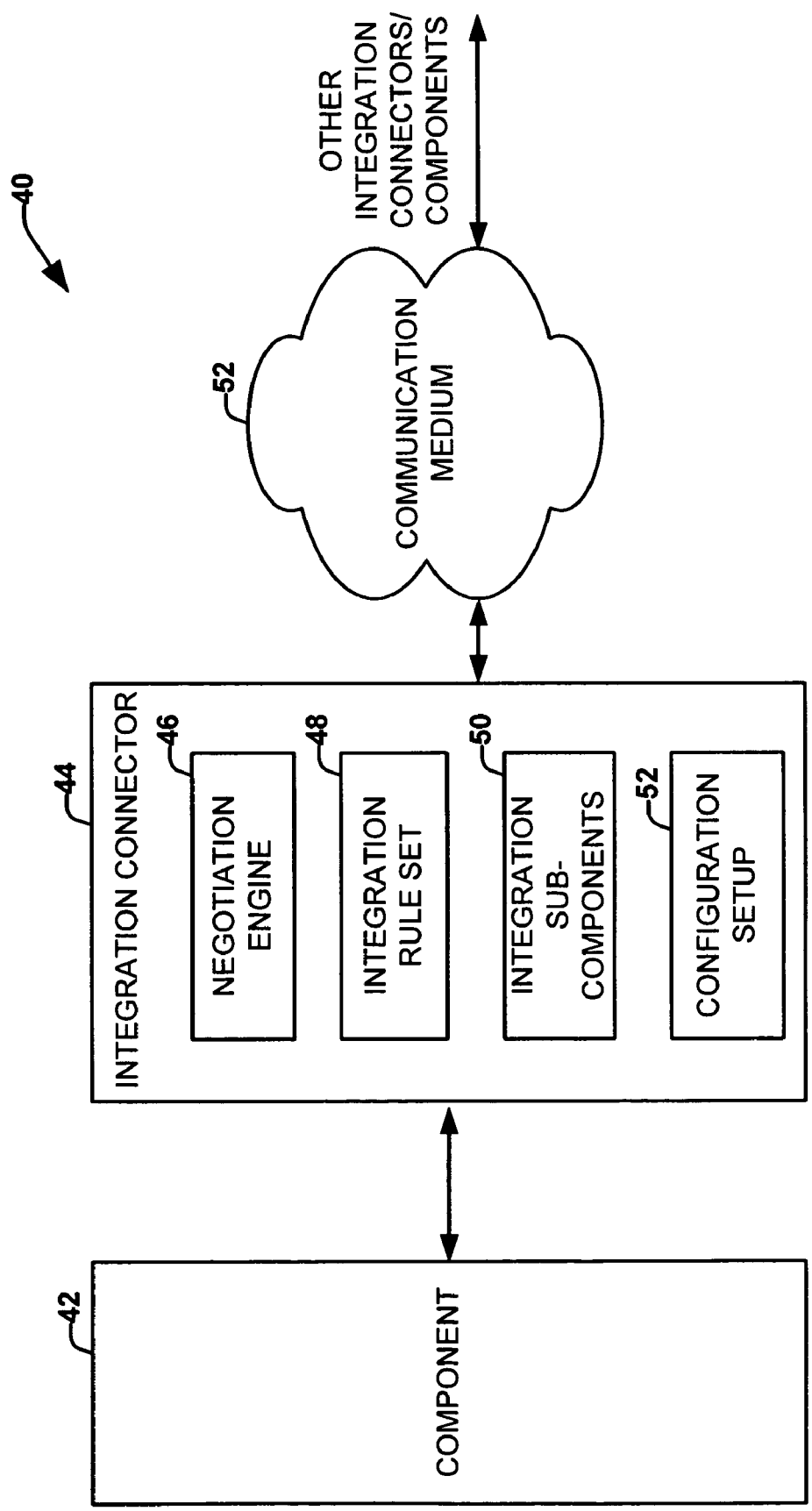
FIG. 2 illustrates a system for integrating software components in accordance with an aspect of the present invention.

FIG. 2 illustrates a system 40 that employs an architecture for integrating software components in accordance with an aspect of the present invention. The system 40 includes a dynamic integration connector 44 that provides an interface between a software component 42 and other dynamic integration connectors/software components over a communication medium 52. The software components can reside in a single system or be distributed across a plurality of systems connected together by one or more mediums. The dynamic integration connector 44 includes a negotiation engine 46, an integration rule set 48, a set of integration sub-components 50 and a configuration setup 52. The configuration setup component 52 establishes the logical and physical connections between the software component 42 and the integration connector 44, and the integration connector 44 with the communication medium 52.

The integration rule set 48 defines rules associated with integration of the software component 42 with other previously incompatible or unintegrated software components (e.g., data storage, computer systems). These rules can include a software component identifier and the syntax and the semantics of the resources (data, processes, functions) provided and required by the software component 42. The integration rule set 48 also includes resource access rules that define the rules associated with access and receipt of the resources. The integration rule set 48 also includes the communication or pipe mechanism rules defining the transfer protocols needed to communicate with the software component 42 and the communication/pipe medium (e.g., binary, TCP/IP, IEEE 802.11, middleware definitions, etc.) in which data and/or control is transferred between software component (e.g., description of middleware, network, operating system, etc.) and other software components. The integration rule set 48 can also include flow control rules (e.g., sequential, event driven) that indicate the flow of control associated with the software component.

The architecture includes at least one negotiation engine 46 that negotiates the flow process, the data transfers and/or control transfers between software components. The negotiation engine can be distributed, centralized, or a combination of both. A central negotiation engine can be employed at a remote system, or a respective negotiation engine can be associated with a respective integration connector. The negotiation engine 46 can be an executable program/or software process with built in intelligence for communicating with other negotiation engines of respective dynamic connectors, so as to define transfers of data and/or control between software components.

The negotiation engine 46 can include embedded data or programs that may be developed prior to integration of software components, created statically or dynamically at deployment or execution time. The negotiation engine 46 can include executable code that allows integration rules to be dynamically created, thus impacting the execution of the integrated system. The negotiation engine 46 can also include executable code for invoking the spontaneous integration of its respective software component 42. Additionally, the negotiation engine 46 can include executable code operative to spontaneously modify integration configurations in response to changes caused by system/component changes and/or the adding of additional systems/components to the current integrated system. Therefore, the dynamic integration connector 44 can constantly monitor interface and workflow connection opportunities available at any instant in time.

The negotiation engine 46 can employ a set of sub-components 50 to define transfers of data and/or control between the software component 42 and associated connected software components. The set of integration sub-components 50 can include data selection and negotiation protocols, data configuration protocols, and data transfer protocols. The negotiation engine 46 employs data selection and negotiation protocols that allow the negotiation engine 46 to communicate and negotiate data and control transfers between other software components through respective dynamic connectors.

For example, this can be accomplished by negotiation engines of respective software components publishing their respective integration rule sets and subscribing to integration rule sets associated with other software components. The negotiation engine 46 selects from a plurality of available data configuration protocols based on resource syntax and semantic rules defined in the integration rule set for its software component and a connecting software component to translate or map data and/or control types between connecting software components. The negotiation engine 46 selects from a plurality of available data transfer protocols based on communication mechanism rules defined in the integration rule set for its software component and a connecting software component to define data transfer mechanism for data and/or control between connecting software components. Finally, the negotiation engine 46 defines an execution flow of data and/or control based on flow control rules defined in the integration rule set 48 for its software component and the integration rule set of a respective connected software component.

Figure 3:
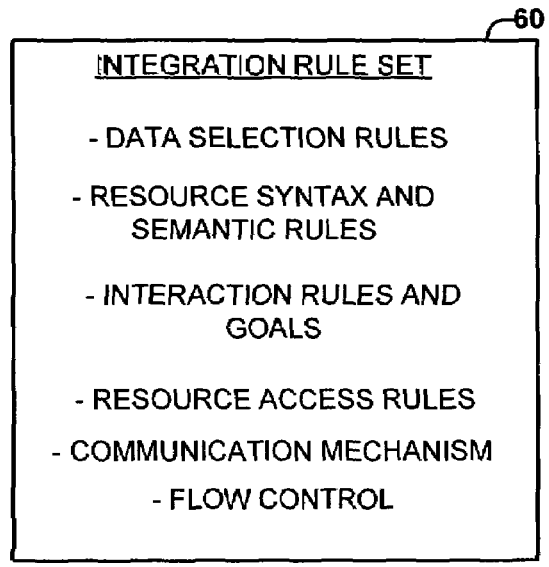
FIG. 3 illustrates an integration rule set associated with a dynamic integration connector in accordance with an aspect of the present invention.

FIG. 3 illustrates an integration rule set 60 associated with a dynamic integration connector in accordance with an aspect of the present invention. The integration rule set 60 defines rules associated with integration of a respective software component. These rules include an identifier associated with the software component to be integrated and the syntax and the semantics of the resources (data, processes, functions) provided and required by the software component. The integration rule set 60 also includes interaction rules resource access rules and goals that, for example, define the frequency of interaction desired and triggering events for these interactions. The integration rule set 60 also includes resource access rules that define the frequency of each resource needed/provided, and/or describe the conditions under which the resources are provided or required. The integration rule set 60 also includes the communication or pipe mechanism rules defining the transfer protocols needed to communicate with the software component and the communication/pipe mechanism being used to integrate with other systems (e.g., description of middleware, binary transfer, network protocol, operating system protocol, etc.).

The integration rule set 60 can also include flow-control rules that indicate the flow of control associated with the software component. For example, the flow-control rules can define that the software component is driven at an end of the execution of the component (e.g., a linear flow of control), or is driven by a request for needed resources or the provision of resources to the external world (e.g., an event-driven paradigm), or on a time-periodic basis (e.g., a time-driven paradigm).

Figure 4:
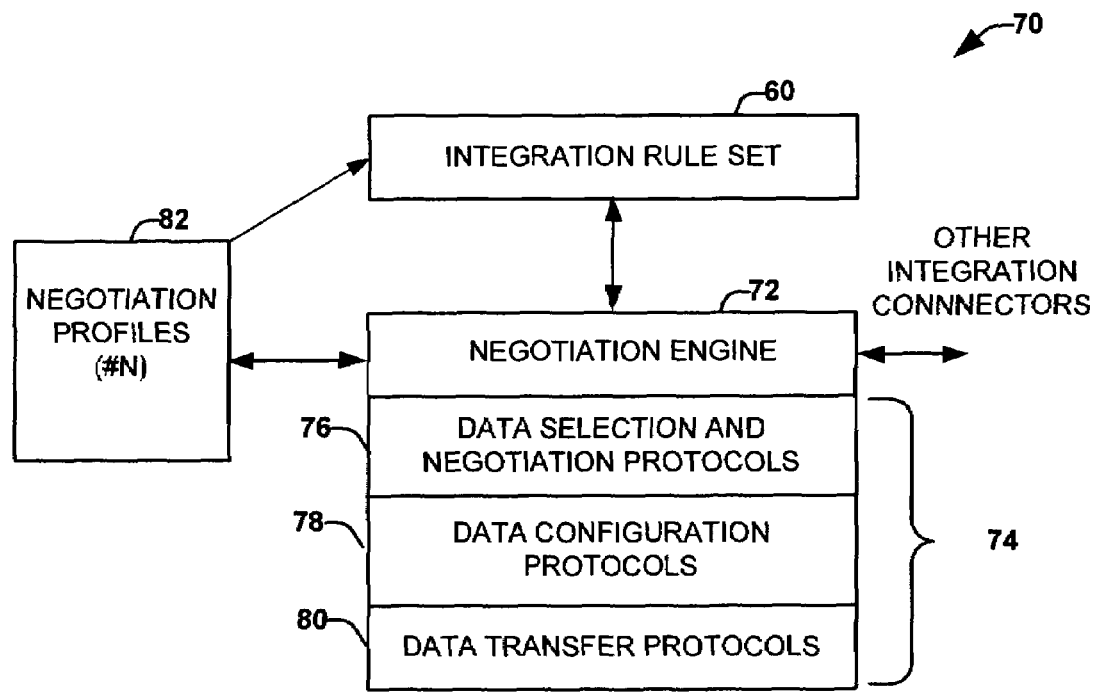
FIG. 4 illustrates a dynamic integration connector system in accordance with an aspect of the present invention.

FIG. 4 illustrates a dynamic integration connector system 70 in accordance with an aspect of the present invention. The dynamic integration connector system 70 provides an interface between a software component and other intelligent integration connectors/software components over a communication medium (e.g., operating system, network, middleware, etc.). The dynamic integration connector system includes a negotiation engine 72, an integration rule set 60, and a set of integration sub-components 74. The negotiation engine 72 is an executable program/or software process that communicates with other negotiation engines of respective dynamic integration connectors to define transfers of data and/or control between software components. It is to be appreciated that a single negotiation engine can be employed to communicate with integration connectors and define data and/or control transfers between software components. The negotiation engine 72 extracts information from an integration rule set 60. As previously stated, the integration rule set 60 defines rules associated with the syntax, semantics, access, communication medium and flow control of resources (e.g., data, process, control) of an associated software component.

The negotiation engine 72 employs data selection and negotiation protocols 76 that allow the negotiation engine 72 to communicate and negotiate data and control transfers between other software components through respective dynamic connectors. For example, this can be accomplished by negotiation engines of respective software components publishing their respective integration rule sets and subscribing to integration rule sets associated with other software components. The negotiation engine 72 selects from a plurality of available data configuration protocols 78 to map data and/or control from a respective software component to one or more other software components. The negotiation engine 72 selects from a plurality of available data transfer protocols 80 based on rules defined in the integration rule set 60 and respective integration rule sets of connecting components to define a data transfer mechanism for data and/or control to one or more other software components. Finally, the negotiation engine 72 defines an execution flow of data and/or control based on rules defined in the integration rule sets executing flow control between the negotiation engine's software component and one or more other software components.

The negotiation engine 72 can then dynamically generate a negotiation profile 82 at initiation or during execution (or later use) that defines the data and/or control connectivity between the software component and a connecting software component based on the negotiations. A respective negotiation profile can be generated for communication with each connected software component and/or data within a respective connected software component. Alternatively, a single negotiation profile can be employed to define variables and/or flow-control associated with communication with all connected software components for a given software component.

Figure 5:
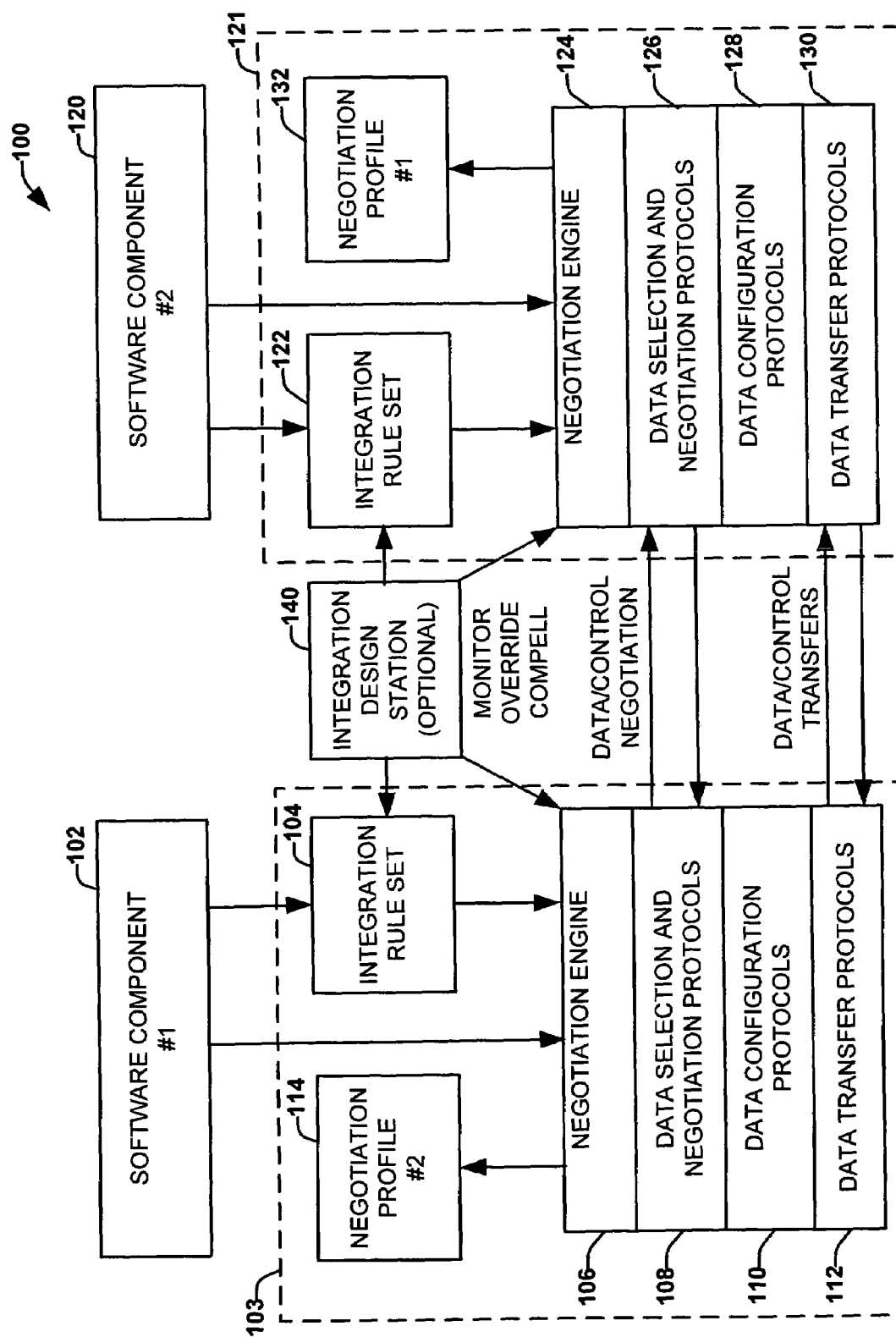
FIG. 5 illustrates a block diagram of a system for integration of software components in accordance with another aspect of the present invention.

FIG. 5 illustrates a block diagram of a system 100 for integration of software components in accordance with an aspect of the present invention. The system 100 includes a first software component 102 and an associated first dynamic integration connector 103, and a second software component 120 and an associated second dynamic integration connector 121. The first dynamic integration connector 103 includes an integration rule set 104 that defines rules associated with available resources and desired resources of the first software component 102. These rules define the necessary syntax and the semantics, resource access, communication mechanisms, and flow-control required to integrate with the first software component 102. The second dynamic integration connector 121 also includes an integration rule set 122 that defines rules associated with available resources and desired resources of the second software component 120. These rules define the necessary syntax and the semantics, resource access, communication mechanisms, and flow-control required to integrate with the second software component 120.

Upon invocation, a negotiation engine 106 of the first dynamic integration connector 103 begins searching across the communications medium for other integration connectors, using mechanisms and protocols built into every integration connector for that purpose. Since these mechanisms and protocols could be the same in every instance of the integration connector, if there is a communications path between any two integration connectors at the time of the search, negotiations can take place. For example, negotiation engine 106 communicates with a negotiation engine 124 of the second dynamic integration connector 121 via one or more data selection and negotiation protocols 108, 126. The negotiation engine 106 publishes the integration rule set 104 to the negotiation engine 124, and the negotiation engine 124 publishes the integration rule set 122 to the negotiation engine 106. The negotiation engine 106 then subscribes to resources in the integration rule set 122, while the negotiation engine 124 subscribes to resources in the integration rule set 104. Based on negotiation between the negotiation engines 106 and 124, the negotiation engine 106 builds one or more negotiation profiles 114 and the negotiation engine 124 builds one or more negotiation profiles 132.

The negotiation profiles 114 define rules for the first software component 102 when providing and receiving resources and/or control from the second software component 120. The negotiation profiles 132 define rules for the second software component 120 when providing and receiving resources and/or control from the first software component 102. These rules can be in the form of software component and control mechanisms that define data translations, conversions or mappings between resources and/or flow-control between the first software component 102 and the second software component 120, and data transfer protocols that allow data and control transfer communications between the first software component 102 and the second software component 120. The negotiation engines 106 and 124 select from a plurality of available data configuration protocols 110, 128 based on rules defined in the integration rule sets 104 and 122 and a plurality of available data transfer protocols 112, 130 based on communication mechanism rules defined in the integration rule sets 104 and 122 to define data transfer mechanism for data and/or control between first and second software components 102 and 120. The negotiation profiles 114 and 132 can also define an execution flow of data and/or control, based on flow-control rules defined in the integration rule sets 104 and 122.

For example, each particular data element can include its own mapping or schema for translating data between data formats. Furthermore, each receipt or transmission of data and/or flow-control can invoke execution of a particular process or program. Additionally, each transmission of data or control can be transferred over different communication pipes and/or protocols. All of this information is stored in the negotiation profiles 114 and 132, and employed during normal execution to establish integrated execution between the first and second software components 102 and 120.

An integration design station or monitor 140 can be employed to allow a central control over, or manual intervention/over-ride of the integration process. The integration design station 140 allows a user to submit configuration information to the negotiation engines 106 and 124 of the respective dynamic integration connectors 103 and 121. Additionally, the integration design station 140 can provide functionality associated with initiations, sequential control, and monitoring of the business work-flow process, over-riding capabilities associated with the spontaneous negotiations, in addition to compelling negotiations between the first and second integration connectors 103 and 121. For example, the integration design station 140 can compel negotiations by modifying rules in the integration rule sets 104 and 122.

Figure 6:
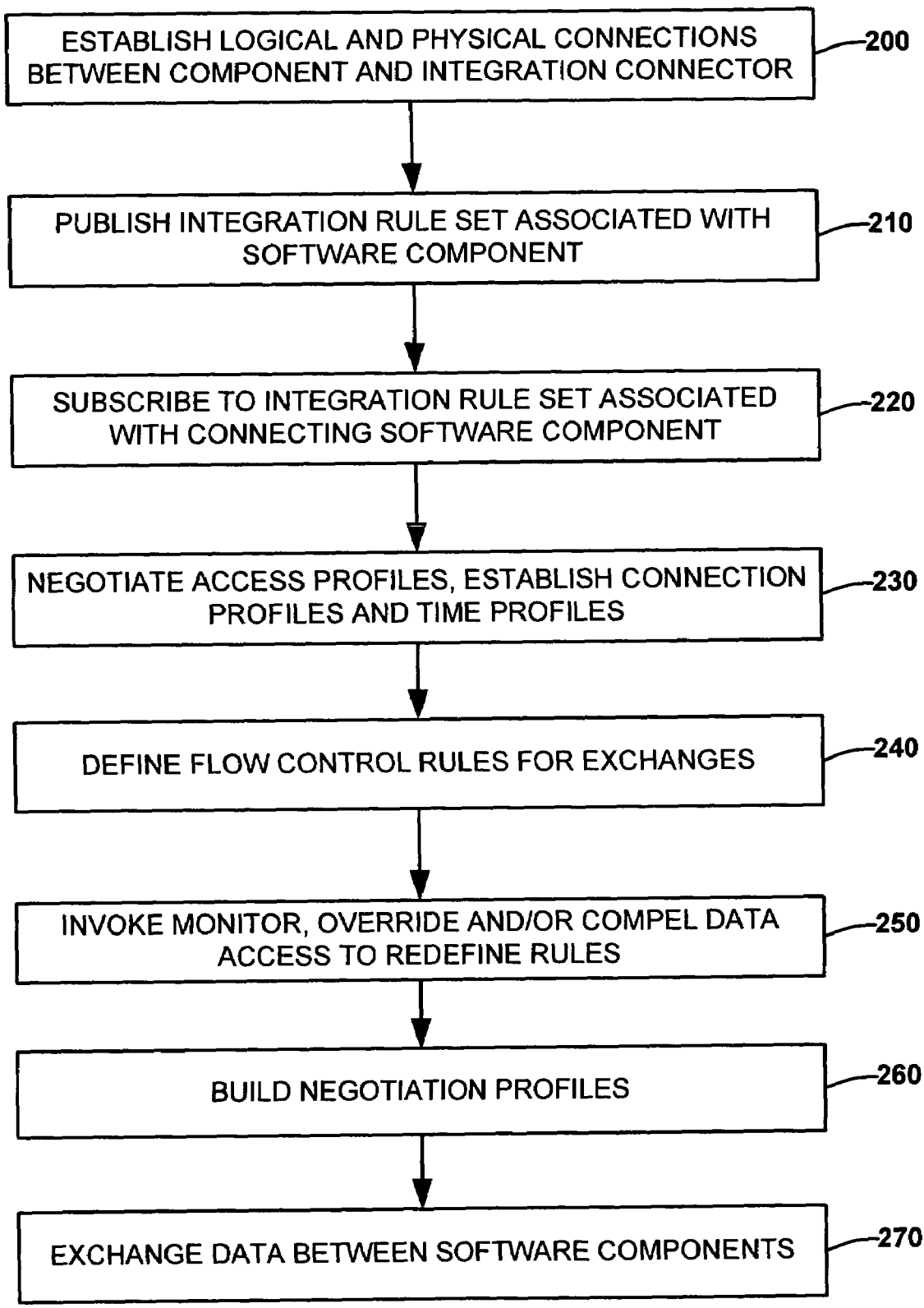
FIG. 6 illustrates a methodology for integrating software components in accordance with an aspect of the present invention.

In view of the foregoing structural and functional features described above, a method will be better appreciated with reference to FIG. 6. It is to be understood and appreciated that the illustrated actions, in other embodiments, may occur in different orders and/or concurrently with other actions. Moreover, not all illustrated features may be required to implement a method. It is to be further understood that the following methodologies can be implemented in hardware (e.g., a computer or a computer network as one or more integrated circuits or circuit boards containing one or more microprocessors), software (e.g., as executable instructions running on one or more processors of a computer system), or any combination thereof.

FIG. 6 illustrates a methodology for integrating software components in accordance with an aspect of the present invention. The methodology begins at 200, with a configuration setup activity. The configuration setup activity establishes the logical and physical connections between an integration connector and its respective software component. The methodology then proceeds to 210. At 210, an integration connector publishes an integration rule set associated with a software component. Publishing of the integration rule set allows other software components to view the integration rules associated with the software component. The integration rule set defines the available and required resources for the software component. In particular, the integration rule set defines rules associated with the syntax, semantics, access, communication medium and flow control of resources (e.g., data, process, control) of an associated software component. At 220, the integration connector subscribes to one or more other integration rule sets associated with connecting software components. The methodology then proceeds to 230.

At 230, the integration connector begins negotiating access profiles, establishing connection profiles and time profiles with one or more other software components via respective integration connectors. At 240, the integration connector defines flow control rules for exchanges between the software component and any connecting components. At 250, an integration design station can be employed to monitor, override and/or compel data and/or control access, for example, by redefining the integration rules of one or more integration rule sets of the software component and any connecting software components. At 260, the integration connector builds a negotiation profile. Additionally, negotiation profiles can be built by one or more connecting components. The negotiation profiles define rules for the software components when exchanging resources and/or control. These rules includes data translations, conversions or mappings between resources and/or flow-control between the software components, and data transfer protocols that allow data and control transfer communications between the software components. At 270, data and/or control are exchanged between software components employing the respective negotiation profiles.

It is to be appreciated that the integration connectors can be operative to modify dynamically the respective negotiation profiles and respective exchanges, based on changes in one or more software components of the system, and/or addition of other software components that are added to the system.

Figure 7:
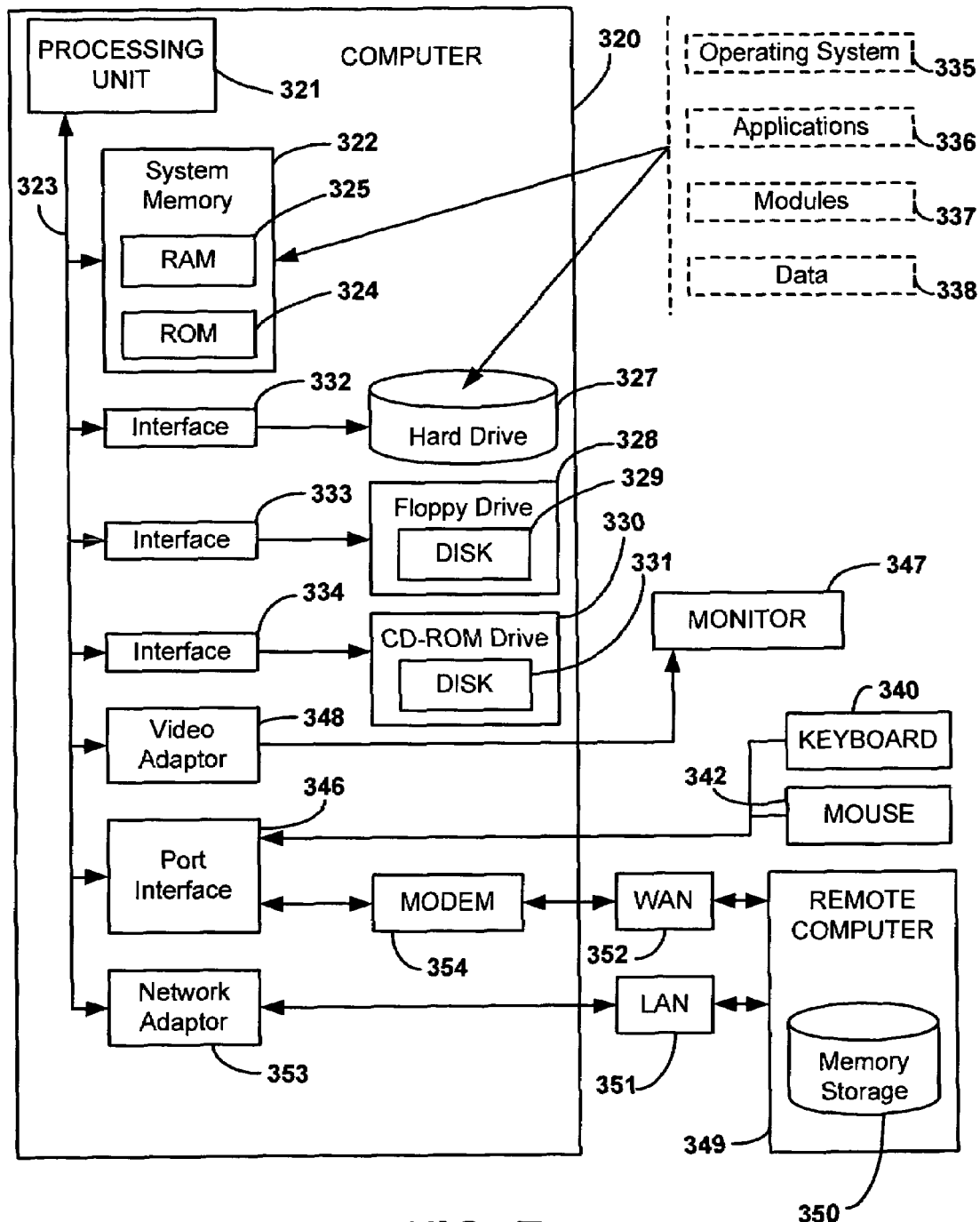
FIG. 7 illustrates an embodiment of a computer system.

FIG. 7 illustrates a computer system 320 that can be employed to execute one or more embodiments employing computer executable instructions. The computer system 320 can be implemented on one or more general purpose networked computer systems, embedded computer systems, routers, switches, server devices, client devices, various intermediate devices/nodes and/or stand alone computer systems.

The computer system 320 includes a processing unit 321, a system memory 322, and a system bus 323 that couples various system components including the system memory to the processing unit 321. Dual microprocessors and other multi-processor architectures also can be used as the processing unit 321. The system bus may be any of several types of bus structure including a memory bus or memory controller, a peripheral bus, and a local bus using any of a variety of bus architectures. The system memory includes read only memory (ROM) 324 and random access memory (RAM) 325. A basic input/output system (BIOS) can reside in memory containing the basic routines that help to transfer information between elements within the computer system 320.

The computer system 320 can includes a hard disk drive 327, a magnetic disk drive 328, e.g., to read from or write to a removable disk 329, and an optical disk drive 330, e.g., for reading a CD-ROM disk 331 or to read from or write to other optical media. The hard disk drive 327, magnetic disk drive 328, and optical disk drive 330 are connected to the system bus 323 by a hard disk drive interface 332, a magnetic disk drive interface 333, and an optical drive interface 334, respectively. The drives and their associated computer-readable media provide nonvolatile storage of data, data structures, and computer-executable instructions for the computer system 320. Although the description of computer-readable media above refers to a hard disk, a removable magnetic disk and a CD, other types of media which are readable by a computer, such as magnetic cassettes, flash memory cards, digital video disks and the like, may also be used in the operating environment, and further that any such media may contain computer-executable instructions.

A number of program modules may be stored in the drives and RAM 325, including an operating system 335, one or more executable programs 336, other program modules 337, and program data 338. A user may enter commands and information into the computer system 320 through a keyboard 340 and a pointing device, such as a mouse 342. Other input devices (not shown) may include a microphone, a joystick, a game pad, a scanner, or the like. These and other input devices are often connected to the processing unit 321 through a corresponding port interface 346 that is coupled to the system bus, but may be connected by other interfaces, such as a parallel port, a serial port or a universal serial bus (USB). A monitor 347 or other type of display device is also connected to the system bus 323 via an interface, such as a video adapter 348.

The computer system 320 may operate in a networked environment using logical connections to one or more remote computers, such as a remote client computer 349. The remote computer 349 may be a workstation, a computer system, a router, a peer device or other common network node, and typically includes many or all of the elements described relative to the computer system 320. The logical connections can include a local area network (LAN) 351 and a wide area network (WAN) 352.

When used in a LAN networking environment, the computer system 320 can be connected to the local network 351 through a network interface or adapter 353. When used in a WAN networking environment, the computer system 320 can include a modem 354, or can be connected to a communications server on the LAN. The modem 354, which may be internal or external, is connected to the system bus 323 via the port interface 346. In a networked environment, program modules depicted relative to the computer system 320, or portions thereof, may be stored in the remote memory storage device 350.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A software integration architecture residing on a computer readable medium, the software integration architecture comprising:
    an integration rule set associated with each of a plurality of software components, the integration rule set defining rules associated with access and receipt of resources for a given software component;
    a negotiation engine that is executable by a processing unit to negotiate dynamically with respective connecting software components to define rules associated with integration of the software components based on the integration rule sets of the respective connecting software components; and
    an integration sub-component set that provides a selection of data configuration protocols and data transfer protocols that are accessed and employed by the negotiation engine to define flow control, data conversions and communication mechanisms during transfer of data and control between respective connecting software components based on the negotiations between the respective connecting software components for integration of the respective connecting software components.

2. The architecture of claim 1, wherein an integration rule set defines rules associated with the syntax, semantics, access, communication medium and flow control of resources of an associated software component.

3. The architecture of claim 2, wherein the resources are one of data, processes, and control of a respective software component.

4. The architecture of claim 1, wherein each software component has a respective negotiation engine, the negotiation engines communicate with one another employing data selection and negotiation protocols.

5. The architecture of claim 1, wherein the negotiation engine selects from a plurality of data configuration protocols based on rules defined in the integration rule sets for at least one of translating data and control between software components.

6. The architecture of claim 1, wherein the negotiation engine selects from A plurality of data transmission protocols based on rules defined in the integration rule sets for at least one of transmitting data and control between software components.

7. The architecture of claim 1, wherein the negotiation engine includes executable code operative to spontaneously modify an integrated system in response to at least one of changes in at least one software component and an addition of a software component to the system.

8. The architecture of claim 1, wherein a negotiation profile is generated for each software component that defines at least one of data and control connectivity between a respective software component and a connecting software component based on the negotiations.

9. The architecture of claim 8, wherein the communication mechanisms comprise data access schemas that allow the negotiation engine to extract data from software components.

10. The architecture of claim 8, wherein the negotiation profiles comprise software programs and control mechanisms that implement data links, format conversions and synchronization for at least one of control and data between software components.

11. the architecture of claim 10, further comprising an integration design station that provides functionality associated with at least one of: initiating integration between dynamic software components; sequential control between software components; event control between software components; and monitoring of data and control flow processes.

12. The architecture of claim 1, further comprising an integration design station operative to compel negotiations between negotiation engines by modifying integration rule sets associated with software components.

13. A computer readable medium having computer executable components comprising:
    an integration rule set that defines rules associated with access and receipt of resources for a software component;
    a negotiation engine operative to negotiate dynamically with at least one other negotiation engine of a respective connecting software component to define rules associated with integration of the software components based on the integration rule set; and
    an integration sub-component set that provides a selection of data configuration protocols and data transfer protocols that are employed by the negotiation engine to define flow control, data conversions and communication mechanisms for transferring data and control between the software component and at least one connecting software component based on the negotiations between the respective connecting software components for integration of the software component and the at least one connecting software component.

14. The computer readable medium of claim 13, wherein the integration rule set defines rules associated with the syntax, semantics, access, communication medium and flow control resources of the software component.

15. The computer readable medium of claim 13, wherein the integration sub-component set comprises at least one data selection and negotiation protocol that allows the negotiation engine to communicate with and select data from at least one other negotiation engine associated with a connecting software component.

16. The computer readable medium of claim 13, wherein the negotiation engine generates a negotiation profile that includes software programs and control mechanisms that implement data links, format conversions and synchronization for at least one of control and data between the software component and at least one other connecting software component.

17. A computer readable medium having computer executable instructions for performing a method comprising:
  publishing an integration rule set associated with a software component;
  subscribing to an integration rule set associated with a connecting software component;
  negotiating with the connecting software component to define data access profiles, connection profiles and flow control profiles for the exchange of at least one of data and control between the software component and the connecting software component based on the published integration rule set and the subscribed to integration rule set;
  building a negotiation profile that defines the at least one of data and control connectivity between the software component and the connecting software component based on the negotiations; and
  exchanging at least one of data and control between the software component and the connecting software component.

18. The method of claim 17, wherein the negotiating with the connecting software component comprising selecting from a plurality of data configuration protocols for at least one of translating data and control between the software component and the connecting software component.

19. The method of claim 17, wherein the negotiating with the connecting software component comprising selecting from a plurality of data transmission protocols for at least one of transmitting data and control between the software component and the connecting software component.

20. The method of claim 17, further comprising modifying the negotiation profile in response to at least one of changes in at least one software component and an addition of a new connecting software component.

21. The method of claim 17, wherein the building of the negotiation profile comprises generating software programs and control mechanisms that implement data links, format conversions and synchronization for at least one of control and data between the software component and the connecting software component.

22. The method of claim 17, further comprising compelling negotiations between the software component and the connecting software component by modifying integration rule sets associated with at least one of the software component and the connecting software component.

23. The method of claim 17, further comprising establishing logical and physical connections between the software component and its published integration rule set.

24. A distributed integration architecture comprising:
  a plurality of software components residing on at least one computer readable medium and communicatively coupled to a communication medium; and
  a plurality of integration connectors that are each associated with a respective one of the plurality of software components, each of the integration connectors being configured to publish an integration rule set associated with the respective one of the plurality of software components for access by any other one or more of the plurality of integration connectors for a negotiation of data access profiles, connection profiles, and flow control profiles for the exchange of at least one of data and control between any two or more of the plurality of software components across the communication medium based on the published integration rule sets of the any two or more of the plurality of software components.

25. The distributed integration architecture of claim 24, further comprising an integration design station configured to one of dynamically generate and modify an integration connector of the plurality of integration connectors in response to a respective one of adding and modifying a software component of the plurality of software components.

26. The distributed integration architecture of claim 24, further comprising an integration design station operative to compel negotiations between a plurality of negotiation engines that are each associated with a respective one of the plurality of software components by modifying the integration rule sets associated with each of the plurality of software components.

27. The distributed integration architecture of claim 24, wherein the plurality of software components are distributed over a plurality of computers.

* * * * *